US009258258B2

(12) United States Patent
Vanderwiel

(10) Patent No.: US 9,258,258 B2
(45) Date of Patent: Feb. 9, 2016

(54) IMPLEMENTING INJECTION OF FORMAL NUMERICAL MESSAGE IDENTIFIERS IN CLOUD STACKS

(71) Applicant: International Business Machines Corporation, Armonk, NY (US)

(72) Inventor: Mark R. Vanderwiel, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 14/058,694

(22) Filed: Oct. 21, 2013

(65) Prior Publication Data

US 2015/0113075 A1    Apr. 23, 2015

(51) Int. Cl.
*G06F 15/16* (2006.01)
*H04L 12/58* (2006.01)
*G06F 11/30* (2006.01)
*G06F 17/22* (2006.01)

(52) U.S. Cl.
CPC ............ *H04L 51/02* (2013.01); *G06F 11/3006* (2013.01); *G06F 17/2229* (2013.01)

(58) Field of Classification Search
CPC ............ G06F 10/107; G06F 11/3006; G06F 17/2229; G06Q 10/107
USPC ........................ 704/2, 8, 9, 10; 709/203, 206
See application file for complete search history.

(56) References Cited

U.S. PATENT DOCUMENTS

| | | | |
|---|---|---|---|
| 8,548,997 B1* | 10/2013 | Wu ....................... | G06Q 10/103 707/736 |
| 2003/0061121 A1* | 3/2003 | Ouchi .................... | G06Q 30/06 705/26.5 |
| 2006/0058048 A1* | 3/2006 | Kapoor .................. | G06Q 30/02 455/466 |
| 2006/0287844 A1* | 12/2006 | Rich ...................... | G06F 17/289 704/2 |
| 2007/0118647 A1* | 5/2007 | Lee ....................... | G06Q 10/107 709/225 |
| 2007/0174402 A1* | 7/2007 | Tomkow .............. | G06Q 10/107 709/206 |
| 2007/0225965 A1* | 9/2007 | Fallen-Bailey ........ | G06F 17/289 704/9 |
| 2008/0086532 A1* | 4/2008 | Cunningham ........ | G06Q 10/107 709/206 |
| 2011/0179050 A1* | 7/2011 | Parsons .................. | G06Q 40/00 707/755 |
| 2011/0270602 A1* | 11/2011 | Liu ....................... | G06F 17/2229 704/8 |
| 2011/0289428 A1* | 11/2011 | Yuen ..................... | H04L 51/04 715/752 |
| 2012/0110160 A1* | 5/2012 | Papadopoulos ..... | G06F 11/3006 709/224 |

(Continued)

OTHER PUBLICATIONS

John Tamplin, "google-web-toolkit," http://code.google.com/p/google-web-toolkit/wiki/l18nAnnotations, 2008.

(Continued)

*Primary Examiner* — Thu Ha Nguyen
(74) *Attorney, Agent, or Firm* — Joan Bennington

(57) ABSTRACT

A method and apparatus are provided for injecting formal numerical message identifiers in an existing cloud stack. Numerical message identifiers are automatically injected into predefined messages of each translated message catalog before building the translated message catalogs into enhanced binary message catalogs. The numerical message identifiers are generated using an existing unique message identification (msgid) string within the translated message catalog.

20 Claims, 6 Drawing Sheets

(56) References Cited

U.S. PATENT DOCUMENTS

| | | | |
|---|---|---|---|
| 2012/0203542 A1* | 8/2012 | Liu et al. .......................... 704/8 |
| 2012/0297288 A1* | 11/2012 | Mansouri .......... G06F 17/30893 715/234 |
| 2013/0215459 A1* | 8/2013 | Iizuka .................. G06K 15/007 358/1.15 |
| 2013/0215462 A1* | 8/2013 | Maki .................... H04N 1/2195 358/1.15 |
| 2014/0012922 A1* | 1/2014 | Wu ................... G06F 17/30893 709/205 |
| 2014/0101266 A1* | 4/2014 | Bueno .................... H04L 51/08 709/206 |
| 2014/0214969 A1* | 7/2014 | Piccinini ................. H04L 51/02 709/206 |
| 2014/0310243 A1* | 10/2014 | McGee ............. G06F 17/30575 707/639 |
| 2015/0039706 A1* | 2/2015 | Zilmer ................... H04L 51/36 709/206 |
| 2015/0046145 A1* | 2/2015 | Hamahata ........... G06F 17/2881 704/2 |

OTHER PUBLICATIONS

Mark R Vanderwiel, "OpenStack Compute (Nova)," https://blueprints.launchpad.net/nova/+spec/formal-message-ids, Jun. 7, 2013.

\* cited by examiner

300

TERMINAL 128

PROGRAM NV EXECUTING USING ENGLISH

NV1234567 EXAMPLE MESSAGE 1

IMPLEMENTING INJECTION OF FORMAL NUMERICAL MESSAGE IDENTIFIERS IN CLOUD STACKS

FIELD OF THE INVENTION

The present invention relates generally to the data processing field, and more particularly, relates to method and apparatus for implementing automated injecting of formal numerical message identifiers in an existing cloud stack, such as OpenStack, or any software that uses standard message catalogs.

DESCRIPTION OF THE RELATED ART

A need exists for an efficient and effective method and apparatus for implementing injection of formal numerical message identifiers in an existing cloud stack. It is desirable to provide such formal numerical message identifiers to assist with the look up of information about a message in a language neutral way.

SUMMARY OF THE INVENTION

Principal aspects of the present invention are to provide a method and apparatus for implementing injecting formal numerical message identifiers in an existing cloud stack. Other important aspects of the present invention are to provide such method and apparatus substantially without negative effects and that overcome many of the disadvantages of prior art arrangements.

In brief, a method and apparatus are provided for injecting formal numerical message identifiers in an existing cloud stack. Numerical message identifiers are automatically injected into predefined messages of each translated message catalog before building the translated message catalogs into enhanced binary message catalogs. The numerical message identifiers are generated using an existing unique message identification (msgid) string within the translated message catalog.

In accordance with features of the invention, providing numerical non-translated message identifiers assigned to the messages advantageously increases the serviceability and usability of the platform.

In accordance with features of the invention, the numerical message identifiers are non-translated message identifiers that assist with the look up of more information about a message in a language neutral way. For example, a search of a Spanish and Russian message that contains a numerical message identifier, would give similar results and allow trouble shooting information to be better organized together when the numerical non-translated message identifiers are available and uses as a language neutral index into that trouble shooting information.

In accordance with features of the invention, the numerical message identifiers are generated, for example, using a MD5 hash function of the existing unique message identification (msgid) string, or any type of hashing function could be used as long as the resulting hash is unique across the message catalog. The existing unique message identification (msgid) string is available for localization look-up purposes in translated message catalogs. The numerical message identifiers can have a predefined format, such as a program prefix followed 7 Hex Digits.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 illustrates an example user terminal display illustrating an example message with an example formal numerical message identifier generated in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing automated injection of formal numerical message identifiers in an existing cloud stack, such as OpenStack. The numerical message identifiers are non-translated message identifiers that assist with the look up of more information about a message in a language neutral way. The numerical message identifiers are generated using an existing unique message identification (msgid) string within the translated message catalog.

Figure 1:
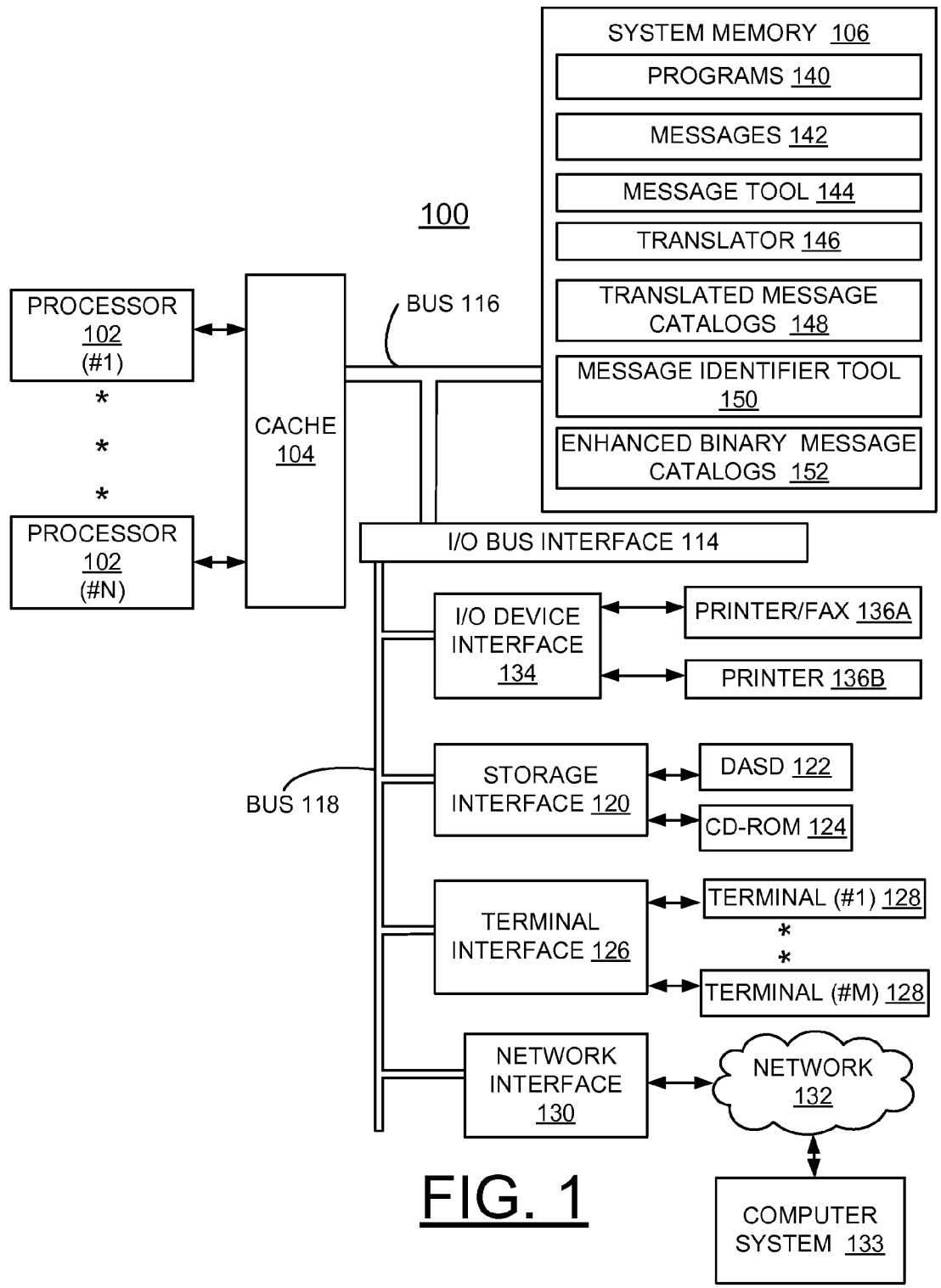
FIG. 1 is a block diagram of an example computer system for implementing automated injection of formal numerical message identifiers in an existing cloud stack in accordance with the preferred embodiment.

Having reference now to the drawings, in FIG. 1, there is shown a computer system embodying the present invention generally designated by the reference character 100 for implementing automated injection of formal numerical message identifiers in an existing cloud stack, such as OpenStack, in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores programs 140, messages 142, a message tool 144, a translator 146, translated message catalogs 148, a message identifier tool 150 for implementing automated injection of formal numerical message identifiers in an existing cloud stack, such as OpenStack, in accordance with the preferred embodiment, and enhanced binary message catalogs 152 generated by the message identifier tool 150 including formal numerical message identifiers in accordance with the preferred embodiment.

Figure 2:
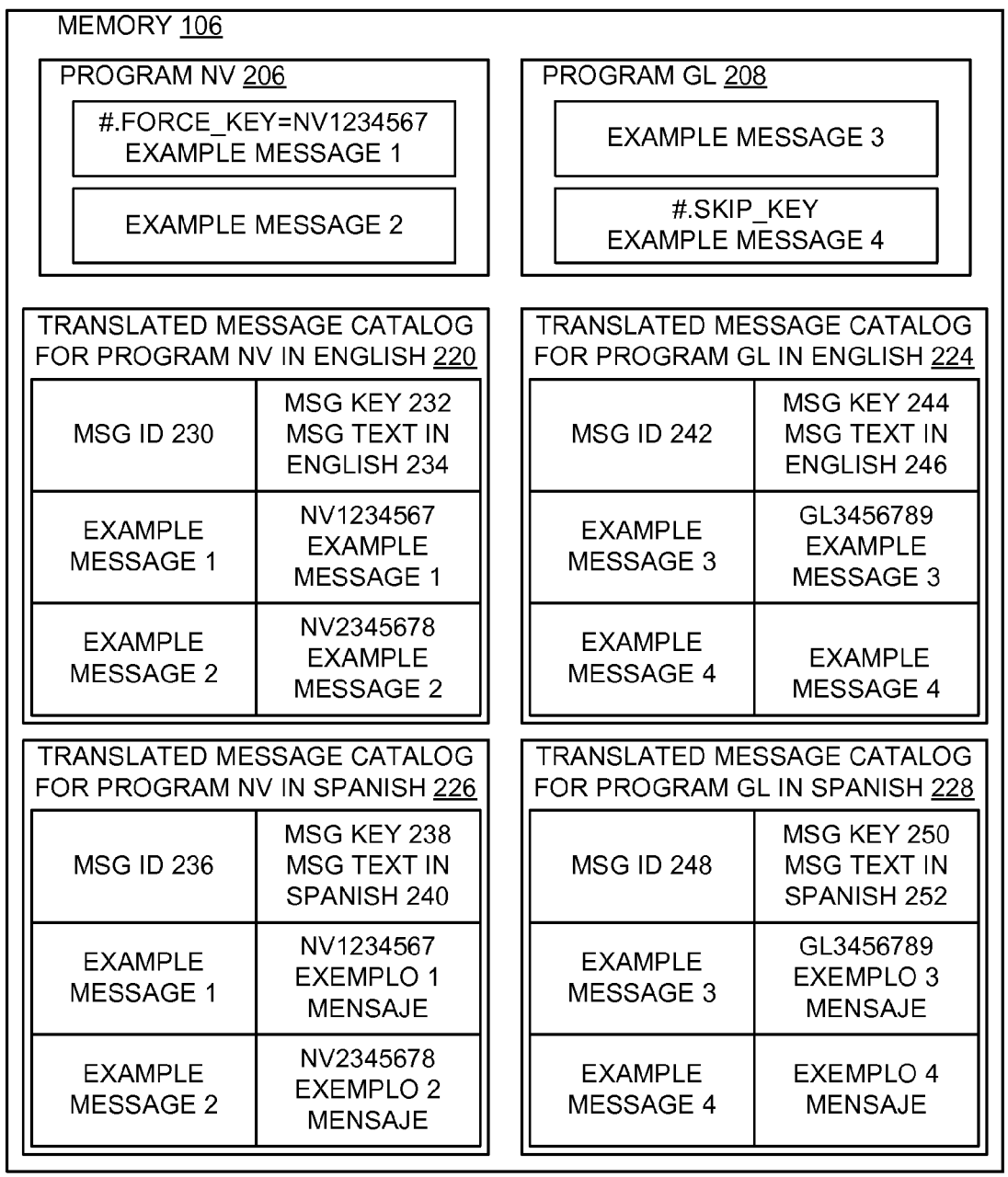
FIG. 2 is a block diagram of a memory of the system of FIG. 1 for implementing automated injection of formal numerical message identifiers in an existing cloud stack illustrating messages with formal numerical message identifiers generated in accordance with the preferred embodiment.

Referring to FIG. 2, there are shown example messages generally designated by the reference character 200 in accordance with the preferred embodiment stored in memory 106 of the system 100.

In accordance with features of the invention, a message with the injected formal numerical message identifiers can include an example predefined format as follows:
  Program Domain Identifier: 2 Alpha Characters.
  Message Identifier: 7 Hex Digits;
  A single blank space;
  the translated message text.
For example, with a Program Domain Identifier of NV, and 7 Hex Digits of 1234567, then example messages before and after the formal numerical message identifier is injected are:
  Before: this is an example message,
  After: NV1234567 this is an example message,
It should be understood that the message with the injected formal numerical message identifiers can include a flexible predefined format, as needed, with the above providing only one example message format.

The Program Domain Identifiers are used to identify the program from which the message was originated. An example naming rule for the program domain identifier is to use the first character of the component name followed by the next non-vowel character in the name as shown in the following examples:
  NV=Nova
  GL=Glance
  KY=Keystone
  SW=Swift
  CN=Cinder
  NT=Neutron
  HT=Heat
  CL=Ceilometer
  HR=Horizon
  IR=Ironic
  OS=Oslo Example messages with formal numerical message identifier including Program Domain Identifiers follows:
  "NV1234567 Nova compute service message about % s."
  "NT7654321 Neutron interface message about % s."
Optionally a prefix can be added to the beginning of the Program Domain Identifiers, for example, an additional Alpha Character to indicate a release name, where each release bumps to a next letter in the alphabet, such as FNV, with F indicating the release name.

The formal numerical message identifier is generated, for example, using a simple MD5 hash function of an existing unique message identification (msgid) string within the translated message catalog or the Portable Object (.po) files. For example, the formal numerical message identifier is generated using an example msgid string as follows:
  >>>print hashlib.md5("an example msgid string").hexdigest( )-[7:]
  >>>8ef1ddf
The formal numerical message identifier will never be translated, and will not impact the translation or development cycles, and would have very little impact upon existing globalization processes. The formal numerical message identifier is generated only for predefined messages in a predefined usage context, such as logging, and other messages that do not need an ID (identification) are skipped.

As shown in FIG. 2, a program NV 206 is shown with a customization as necessary for example, #.FORCED_KEY=NV1234567 with example message 1 and an example message 2. This customization advantageously if a message had just minor changes from previous release, you can keep the same numerical message KEY by just adding a simple developer comment above the message as follows:
  #.FORCED_KEY=NV1234567
  #.This message had minor changes still has same meaning, so keep the old MSG KEY.
As shown in FIG. 2, a program GL 208 is shown with a customization as necessary for example, #. SKIP_KEY with example message 3 and an example message 4.

In FIG. 2, a translated message catalog for program NV in English 220 is shown with a message identifier MSG ID 230 that is used to generate a MSG KEY 232 followed by the message text in English 234. An example message 1 with the MSG KEY 232 of NV1234567 with example message 1 for an enhanced binary message catalog 152 is shown. Another example message 2 with the MSG KEY 232 of NV2345678 with example message 2 for an enhanced binary message catalog 152 is shown.

In FIG. 2, a translated message catalog for program GL in English 224 is shown with a message identifier MSG KEY 242 that is used typically to generate a MSG KEY 244 followed by the message text in English 246. Example message 3 is shown with an example MSG KEY 244 of GL3456789 with an example message 3. Example message 4 is shown without an example MSG KEY 242 responsive to the #. SKIP_KEY customization. If a message does not really need an ID, it can be skipped by just adding a simple developer comment above the message as follows:
  #. SKIP_ID
  #. This message does not need a message ID, lets skip it.

In FIG. 2, a translated message catalog for program NV in Spanish 226 is shown with a message identifier MSG ID 236 that is used to generate a MSG KEY 238 followed by the message text in Spanish 234. An example message 1 with the MSG KEY 236 of NV1234567 with example Spanish message 1 for an enhanced binary message catalog 152 is shown. Another example message 2 with the MSG KEY 238 of NV2345678 with example Spanish message 2 for an enhanced binary message catalog 152 is shown.

In FIG. 2, a translated message catalog for program GL in Spanish 228 is shown with a message identifier MSG ID 248 that typically is used to generate a MSG KEY 250 followed by the message text in Spanish 252. An example message 3 with the MSG ID 242 of GL3456789 with example Spanish message 3 for an enhanced binary message catalog 152 is shown. Another example message 4 without an example MSG KEY with example Spanish message 4 for an enhanced binary message catalog 152 is shown responsive to the #.SKIP_KEY customization.

Referring to FIG. 3, there is shown an example display of the user terminal 128 generally designated by the reference character 300 illustrating an example message with an example formal numerical message identifier NV1234567 generated in accordance with the preferred embodiment together with an example message text.

This new message identifier tool 150 of the preferred embodiment is a utility to add formal numerical message identifiers or MSG KEY to the translated message catalog or translated .po files and creates the enhanced binary message catalogs 152 or .mo files. This new message identifier tool 150 should run just before creating the binary .mo files. A source code comment like: #NOTE: FORCED_ID=NV1234567 will override the auto-generation of a new numerical id. Input would be domain, .po input, and .po_update output names.

Figure 4:
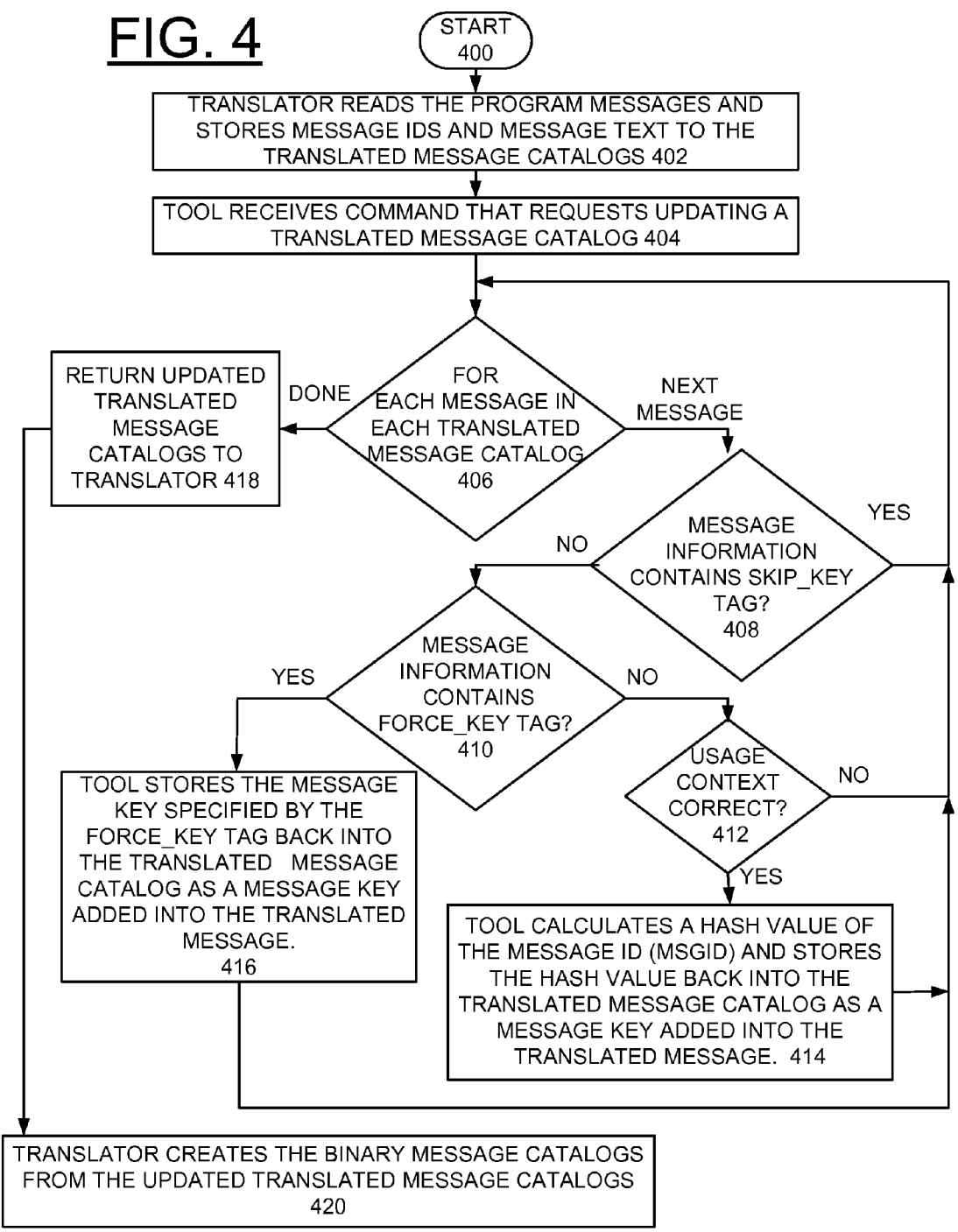
FIGS. 4 and 5 are flow chart illustrating example operations for implementing automated injecting formal numerical message identifiers in an existing cloud stack in accordance with the preferred embodiment.

Referring now to FIG. 4, there are shown example operations for implementing automated injection of formal numerical message identifiers in an existing cloud stack in accordance with the preferred embodiment starting at a block 400. As indicated in a block 402, the translator reads the program messages and stores message IDS and message text to the translated message catalogs. The message identifier tool 150 for implementing automated injection of formal numerical message identifiers in accordance with the preferred embodiment receives a command that requests updating a translated message catalog as indicated in a block 404.

As indicated in a decision block 406, for each message in each translated message catalog, the message identifier tool 150 optionally checks whether the message information contains a skip_key tag as indicated in a decision block 408. If the message information contains a skip_key tag, the operations return to decision block 406 and continue with a next message.

If the message information does not contain a skip_key tag, then the message identifier tool 150 optionally checks whether the message information contains a force_key tag as indicated in a decision block 410.

If the message information does not contain a force_key tag, the message identifier tool 150 analyzes how the message is used within the source and checking is performed to determine if the message usage context is correct as indicated in a decision block 412. If the message usage context is not correct, the operations return to decision block 406 and continue with a next message.

If the message usage context is correct, the message identifier tool 150 calculates a hash value of the message ID and stores the hash value into the translated message catalog as a message key added into the translated message as indicated in a block 414.

If the message information contains a force_key tag, the message identifier tool 150 stores the message key specified by the force_key tag back into the translated message catalog as a message key added into the translated message as indicated in a block 416. The operations return to decision block 406 and continue with a next message. When all messages in each translated message catalog has been processed, then the message identifier tool 150 returns the updated translated message catalogs to the translator as indicated in a block 418.

As indicated in a block 420, the translator creates the enhanced binary message catalogs from the updated translated message catalogs, as the message identifier tool 150 goes through each translated message catalog, an in place update. At block 418 the enhanced binary message catalog is created, with each different language has its own translated message catalog.

Figure 5:
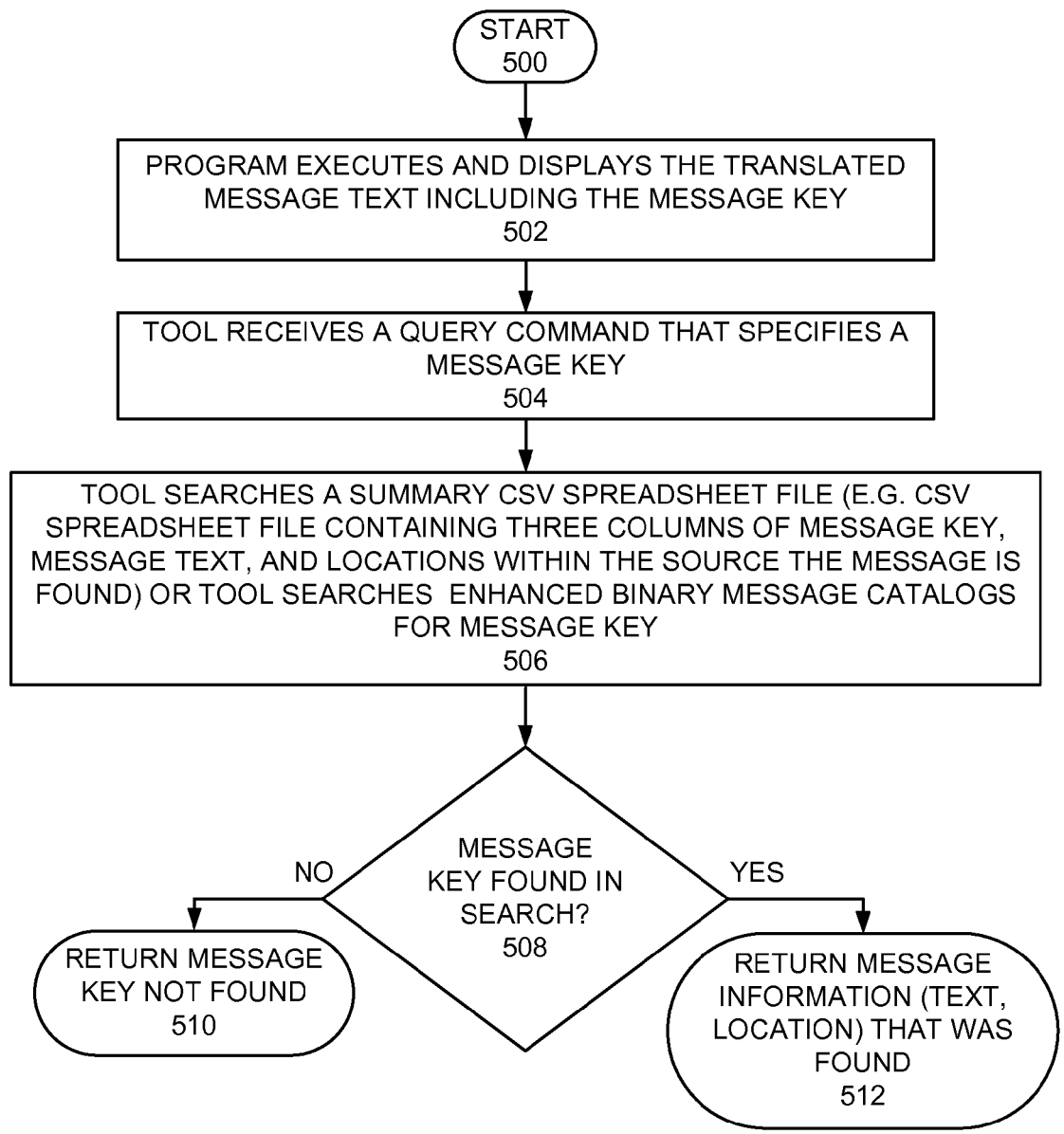

Referring now to FIG. 5, there are shown additional example operations for implementing automated injection of formal numerical message identifiers in an existing cloud stack in accordance with the preferred embodiment starting at a block 500. As indicated in a block 502, a program executes and displays the translated message text and the message key. The message identifier tool 150 receives a query command that specifies a message key as indicated in a block 504. As indicated in a block 506, the message identifier tool 150 searches a summary CSV spreadsheet file, for example, with the summary CSV spreadsheet file shipped with the product as additional information and containing three columns of message key, message text, and locations within the source the message is found. Alternatively the message identifier tool 150 searches the enhanced binary message catalogs for the message key as indicated at block 506. Checking whether the message key was found in the enhanced binary message catalog as indicated in a decision block 508. If the message key was not found, the message is returned with key not found as indicated in a block 510. If the message key was found, the message text is returned that was found as indicated in a block 512.

It should be understood that serviceability notes can be stored into a database where the key is the message key in accordance with the preferred embodiment. This would also make it very simple to look up service information from any translated message with a message key.

Figure 6:
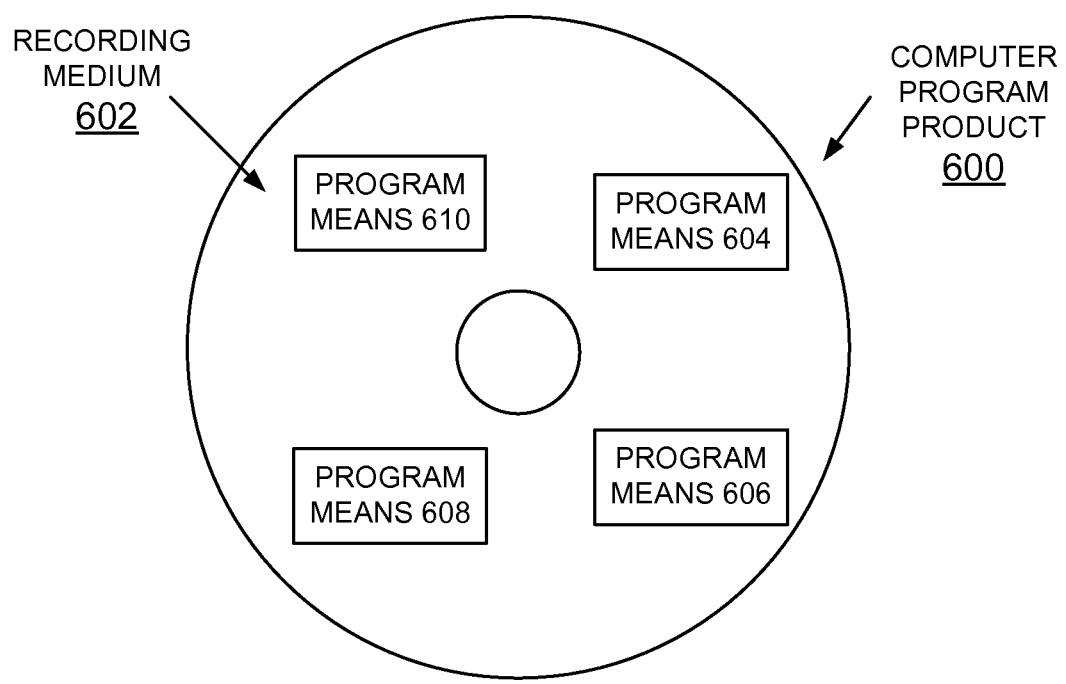
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing automated injection of formal numerical message identifiers in an existing cloud stack of the preferred embodiment in the system 100 of FIG. 1.

A sequence of program instructions or a logical assembly of one or more interrelated modules defined by the recorded program means 604, 606, 608, and 610, direct the system 100 for implementing automated injection of formal numerical message identifiers in an existing cloud stack of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing automated injection of formal numerical message identifiers in an existing cloud stack comprising:
   a processor,
   a message identifier tool tangibly embodied in a non-transitory machine readable medium used in the automated injecting of formal numerical message identifiers;
   said processor using said message identifier tool, receiving a translated message catalog, identifying an existing unique message identification (msgid) string within the translated message catalog for each predefined message in the translated message catalog and generating numerical message identifiers using said identified existing unique message identification (msgid) string for each predefined message within the translated message catalog, said numerical message identifiers being generated without being translated and generally not impacting translation and development cycles, and said processor automatically injecting numerical message identifiers into the predefined messages of the translated message catalog and said processor building an enhanced binary message catalog with the numerical message identifiers stored with message text.

2. The apparatus as recited in claim 1 wherein said processor generating numerical message identifiers using an existing unique message identification (msgid) string within the translated message catalog includes said processor checking for correct message usage context.

3. The apparatus as recited in claim 2 wherein said processor generates the numerical message identifiers using an existing unique message identification (msgid) string within the translated message catalog responsive to identifying correct message usage context for each predefined message.

4. The apparatus as recited in claim 1 wherein said processor generating numerical message identifiers using an existing unique message identification (msgid) string within the translated message catalog includes said processor checking each predefined message information for a skip key tag.

5. The apparatus as recited in claim 4 further includes said processor generating the numerical message identifier responsive to not identifying the skip key tag for the predefined message.

6. The apparatus as recited in claim 1 wherein said processor generating numerical message identifiers using an existing unique message identification (msgid) string within the translated message catalog includes said processor checking each predefined message information for a force key tag.

7. The apparatus as recited in claim 6 further includes said processor generating the numerical message identifier responsive to not identifying the force key tag for the predefined message.

8. The apparatus as recited in claim 6 further includes said processor storing a message key specified by the force key tag responsive to identifying the force key tag.

9. The apparatus as recited in claim 1 wherein said processor generating numerical message identifiers using an existing unique message identification (msgid) string within the translated message catalog includes said processor generating numerical message identifiers using an MD5 hash function of the existing unique message identification (msgid) string.

10. The apparatus as recited in claim 1 wherein said processor generating numerical message identifiers includes said processor generating a predefined format for the predefined message.

11. The apparatus as recited in claim 1 wherein said processor generating numerical message identifiers include said processor providing a program domain identifier identifying a program from which the predefined message originated.

12. A computer-implemented method for injecting formal numerical message identifiers in a computer system including a processor, a message identifier tool tangibly embodied in a non-transitory machine readable medium, said processor using said message identifier tool for automated injecting of formal numerical message identifiers comprising the steps of:
   receiving a translated message catalog,
   identifying an existing unique message identification (msgid) string within the translated message catalog for each predefined message in the translated message catalog and generating numerical message identifiers using said identified existing unique message identification (msgid) string for each predefined message within the translated message catalog, said numerical message identifiers being generated without being translated and generally not impacting translation and development cycles;
   automatically injecting numerical message identifiers into the predefined messages of the translated message catalog; and
   building an enhanced binary message catalog with the numerical message identifiers stored with message text.

13. The method as recited in claim 12 wherein generating numerical message identifiers includes generating formal numerical message identifiers having a predefined formal format.

14. The method as recited in claim 13 wherein said formal numerical message identifiers having a predefined formal format includes a predetermined number of Hex Digits.

15. The method as recited in claim 12 wherein generating numerical message identifiers using an existing unique message identification (msgid) string within the translated message catalog includes checking each predefined message information for a skip key tag, and generating the numerical message identifier responsive to not identifying the skip key tag for the predefined message.

16. The method as recited in claim 12 wherein generating numerical message identifiers using an existing unique message identification (msgid) string within the translated message catalog includes checking each predefined message information for a force key tag, and storing a message key specified by the force key tag responsive to identifying the force key tag.

17. The method as recited in claim 12 wherein generating numerical message identifiers using an existing unique message identification (msgid) string within the translated message catalog includes checking each predefined message information for a force key tag, and generating the numerical message identifier responsive to not identifying the force key tag for the predefined message.

18. The method as recited in claim 12 wherein generating numerical message identifiers using an existing unique message identification (msgid) string within the translated message catalog includes generating numerical message identifiers using an MD5 hash function of the existing unique message identification (msgid) string.

19. The method as recited in claim 18 wherein building an enhanced binary message catalog with the numerical message identifiers stored with message text includes providing a predetermined message format including the numerical message identifiers stored with message text.

20. The method as recited in claim 19 includes providing said predetermined message format including a program domain identifier with the numerical message identifiers.

\* \* \* \* \*